Nov. 21, 1939. W. F. GUSTLIN Re. 21,271

TROUSER SUPPORT AND SHIRT RETAINER

Original Filed July 20, 1936

Inventor

WALTER F. GUSTLIN

J. Ralph Barrow,

Attorney

Reissued Nov. 21, 1939

Re. 21,271

UNITED STATES PATENT OFFICE 21,271

TROUSER SUPPORT AND SHIRT RETAINER

Walter F. Gustlin, Santa Ana, Calif.

Original No. 2,134,442, dated October 25, 1938, Serial No. 91,613, July 20, 1936. Application for reissue February 20, 1939, Serial No. 257,486

6 Claims. (Cl. 241—7)

This invention relates to improvements in articles of wearing apparel and has particular reference to means associated with trousers or like articles for retaining the shirt in a down position and functioning to positively and comfortably support the trousers without necessitating the use of appliances, such as a belt or suspenders.

The principal object of the invention is to provide an elastic member so shaped that it will automatically conform to the figure of the wearer and so formed that it will provide a snug fit about the waist of the user.

An additional object is to provide a support that is equipped on one side with a shirt contacting surface that will effectively grip the shirt to retain the same against blousing, which support has, likewise, provided on its opposite side fastening means for attaching the support to trousers, skirts or other garments.

A further object is to provide a device which is economical to manufacture, simple in construction, efficient in operation and highly serviceable in use.

Other objects and advantages will be apparent during the course of the following description.

Figure 1:
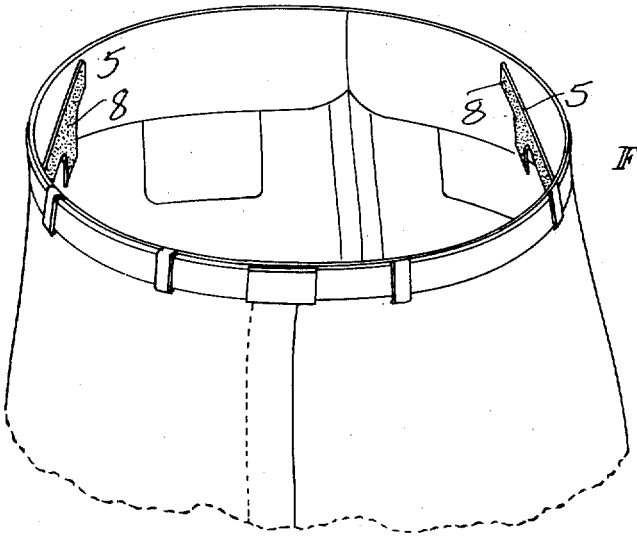
Figure 2:
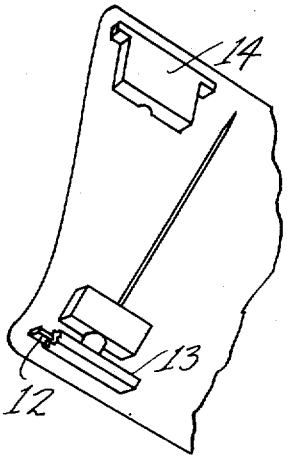
Figure 3:
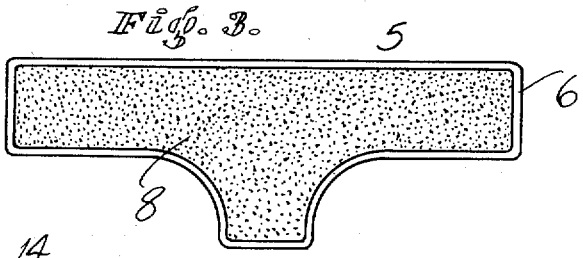
Figure 4:
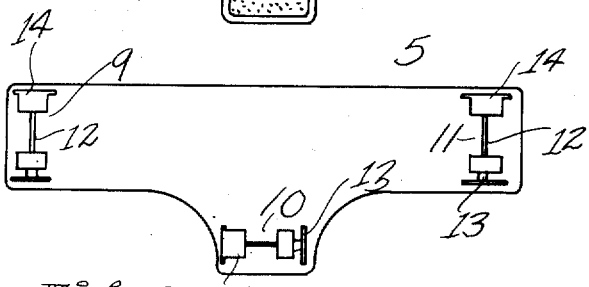

In the accompanying drawing forming a part of this specification and in which like numerals are employed to designate like parts throughout the same, Figure 1 is a perspective view of a portion of a pair of trousers with the supports embodying the invention shown as secured to the trousers, Figure 2 is a fragmentary perspective view, illustrating to advantage the means for securing the device to the supported garment, Figure 3 is a front elevation of the supporter illustrating to advantage the gripping surface, and Figure 4 is a similar view showing the means for fastening the device to the trousers.

In the accompanying drawing wherein for the purpose of illustration is shown a preferred embodiment of my invention, the numeral 5 designates a rubber base member that is beveled at its marginal edge as at 6 to assure comfort to the wearer. It will be noted that one face or surface of the device is of a pebble design as indicated by the numeral 8 to thus provide a cohesive surface, whereby the shirt of the wearer may be retained in a down position. The opposite face of the device is equipped with a novel arrangement of fastening means as indicated by the numerals 9, 10, and 11. Since each of the fastening elements is of similar construction, but one will be described.

Referring to the fastening means 9 it will be noted that a T-headed pin 12 has its upper end retained and encased in a rubber casing 13, in order that the head of the pin may be protected against displacement. Positioned diametrically opposite to the casing 13 is a latch casing 14 made of similar material as the casing 13, which casing 14 is adapted to receive therein the pointed end of the pin 12. By virtue of the arrangement provided, it will be obvious that a unique means of fastening the device for a three point contact with the inner side of the trousers adjacent the belt line is provided.

As will be apparent from Figure 2 the improved fastening device includes as an element the flexible, elastic rubber or like body to which one end of the pin is anchored as at 13, the free end of the pin being associated with a retaining guard 14 secured on the elastic element whereby the free end of the pin can be engaged and disengaged from the guard 14 by flexing and stretching the elastic element or member 5.

While I have shown a belt in conjunction with the device it is to be understood that the belt is merely illustrated for ornamental purposes, for said device provides such a positive grip that there is established a snug contact of the body, thereby so sustaining the weight of the garment equally over the hips, that no belt or suspenders is required. The inherent tension of the device is such as to compensate for the varying size of the waist line of the wearer, without necessitating re-adjustment or causing discomfort to the wearer.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A garment supporting element of the class described capable of being inserted in the waist band of said garment and adapted to retain the shirt of the wearer against displacement relative to the garment and to also support said garment, said supporting element comprising an elongated resilient member having one face thereof adapted to frictionally engage the shirt and having its opposite face provided with T-shaped pins, said T-shaped pins being encased in the material of the resilient member, resilient retaining members formed on said resilient member to receive the free ends of the pins and having notches to engage said free ends of the pins, whereby said pins may be engaged with said retaining members and disengaged therefrom.

2. In a device of the class described, a strip of resilient material adapted to be attached to the waistline of a garment, such as a pair of trousers, said material having a depending portion, one side of said material adjacent the ends thereof being provided with depending means and having securing means for applying the same to the waistband of a pair of trousers, and embodying means comprising a plurality of securing elements consisting of T-headed pins having heads retained in one section of said strip and having their free ends extending outwardly, and means formed on said strip to receive the free ends of said pins, whereby the same may be secured to the outer garment of the wearer.

3. A garment supporting element, of flexible, elastic material and a fastening device for securing said supporter to a garment, said fastening device comprising a safety pin construction of which said garment supporter comprises one element, said garment supporter being flexible and elastic and having means thereon for anchoring one end of a pin, a retaining guard being secured on said elastic element in association with the free end of the pin, whereby the free end of the pin can be engaged with, or released from the guard by flexing and stretching of the element, the pin being inserted and removed from the guard by stretching of the element and being swung toward and away from the guard by the flexing thereof, the anchoring means for one end of said pin comprising an integral formation of the material of the elastic element, and in which formation the anchored end of the pin is embedded.

4. A garment supporting element, of flexible, elastic material, and a fastening device for securing said supporter to a garment, said fastening device comprising a safety pin construction of which said garment supporter comprises one element, said garment supporter being flexible and elastic and having means thereon for anchoring one end of a pin, a retaining guard being formed on said elastic element in association with the free end of the pin, whereby the free end of the pin can be engaged with, or released from the guard by flexing and stretching of the element, the pin being inserted and removed from the guard by stretching of the element and being swung toward and away from the guard by the flexing thereof, the anchoring means for one end of said pin comprising an integral formation of the elastic material of the elastic element, and in which the anchored end of the pin is embedded, and said guard also comprising an integral formation of the elastic material of the elastic element.

5. A fastening device comprising a flexible elastic element having a fastening pin thereon, an anchoring means for one end of the pin on said element, and a guard on said element associated with the free end of said pin, whereby said pin can be engaged and disengaged from the guard by flexing and stretching of the element, said anchoring means and guard being integral formations of the elastic material of the element.

6. A fastening device comprising a flexible elastic element having a fastening pin thereon, an anchoring means for one end of the pin on said element, and a guard on said element associated with the free end of said pin, whereby said pin can be engaged and disengaged from the guard by flexing and stretching of the element, said element comprising elastic material having integral formations thereon, one constituting an anchoring means in which one end of the pin is embedded and the other constituting the guard with which the free end of the pin is adapted to engage.

WALTER F. GUSTLIN.